United States Patent Office 3,518,450
Patented June 30, 1970

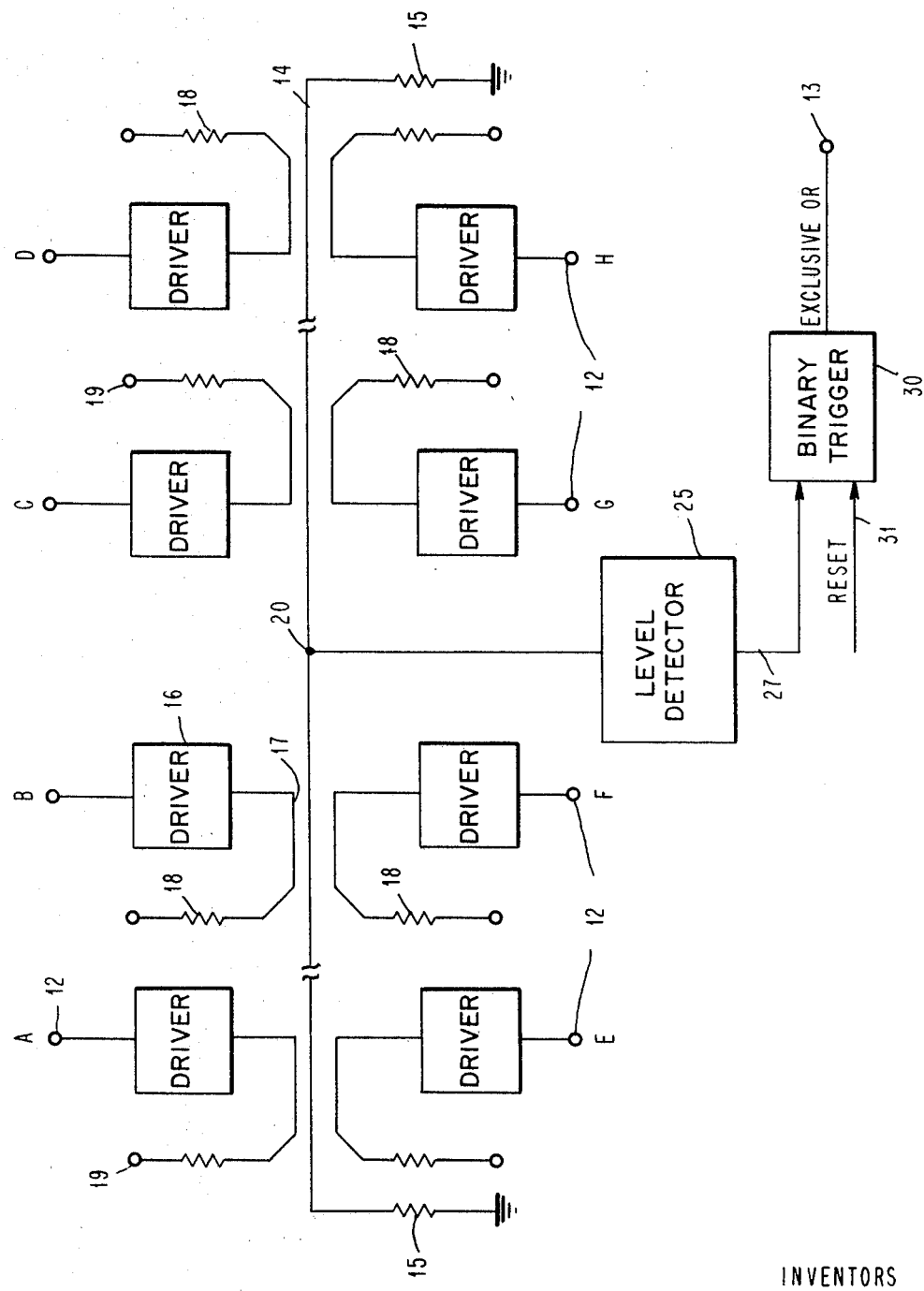

3,518,450
LOGIC CIRCUIT DIRECTIONALLY COM-
BINING SINGLE PULSES REPRESENT-
ING LOGIC VARIABLES
Murray H. Bolt and Howard H. Nick, Poughkeepsie,
N.Y., assignors to International Business Machines
Corporation, Armonk, N.Y., a corporation of New
York
Filed Jan. 13, 1966, Ser. No. 520,517
Int. Cl. H03k 19/32, 19/168
U.S. Cl. 307—216                                6 Claims

ABSTRACT OF THE DISCLOSURE

A logic circuit is provided in which pulses representing logical variables are applied to a stripline microwave transmission device by means of directional couplers and are combined in a logical function that is established by the polarity of the pulses and the direction of the coupler from a signal pickoff point on the stripline. An exclusive OR circuit is disclosed.

INTRODUCTION

Although the Exclusive OR circuit is well known, a review of some of the principles that particularly apply to this invention will be a helpful introduction to the objects of the invention and the terminology that will be used. The Exclusive OR function of two binary logic variables is satisfied if they have opposite values. For two variables A and B this can be written $A\overline{B}+\overline{A}B=1$. If the two variables have like values, the complement Exclusive OR function is satisfied. The Exclusive OR function follows the associative law and the Exclusive OR function of more than two variables can be formed by first forming the Exclusive OR function of pairs and then successively performing the Exclusive OR function of the results. From another standpoint, the Exclusive OR function is satisfied if an odd number of variables have a 1 logic value. Thus, when the variables are presented serially the Exclusive OR operation can be performed by simply counting the 1 valued variables to determine whether the number is odd or even.

OBJECTS

One object of this invention is to provide a new and improved Exclusive OR circuit. A more specific object is to provide a very fast Exclusive OR circuit. Another more specific object is to provide an Exclusive OR circuit that can operate on a large number of parallel input signals. Later in this description some aspects of the invention will be generalized to other logic functions.

INTRODUCTION TO THE INVENTION

The circuit of this invention uses a microwave transmission device that is called a stripline. Stripline couplers and associated drivers are arranged to produce pulses on the stripline according to signals at the driver inputs that represent logic variables. These pulses are the single polarity, single peak, pulses of the type commonly used in logic circuits as contrasted with pulses of a higher frequency carrier wave. The presence or absence of a pulse on the line signifies the value of the logic variable that is to be operated on. Short pulses can be formed on a stripline and propagated in a preselected direction. Where such pulses coincide they add or subtract according to their polarity. In one embodiment of the invention four or fewer couplers are arranged to apply pulses to a common point on a stripline. The combined amplitude of these pulses corresponds to number of pulses present and thereby corresponds to the Exclusive OR function of the variables that the pulses represent. A voltage detector is arranged to sense the voltage level at the point where these pulses coincide and to produce a binary output signifying the Exclusive OR value of the circuit inputs.

In the preferred embodiment of the invention, as many as four stripline couplers are arranged to produce pulses that coincide at a pickoff point. Pairs of couplers are arranged on opposite sides of the stripline so that their outputs merge and propagate toward a pickoff point. Another pair of couplers can be located an equal distance on the opposite side of the pickoff point so that when all four outputs are applied to the line simultaneously, they reach the pickoff point simultaneously. Two of the drivers are arranged to produce negative voltage pulses and two are arranged to produce positive voltage pulses. When both polarities are used, the voltage level at the pickoff point has a simpler relationship to the Exclusive OR function of the input variables, and the voltage detection circuit can be made simpler.

In a further embodiment of the invention, several groups of four or fewer couplers are arranged to be successively farther from the pickoff point so that when all of the inputs are energized simultaneously, a succession of Exclusive OR signifying voltage levels appears at the pickoff point and the corresponding succession of binary outputs appears at the voltage detector output. A binary trigger is connected to the output of the voltage detector to indicate whether there is an odd or an even number of Exclusive OR signals in the series that appears at the voltage detector output. The binary trigger thereby indicates the Exclusive OR function for all of the input variables.

The foregoing and other objects, features and advantages of the invention will be apparent from the following more particular description of preferred embodiments of the invention, as illustrated in the accompanying drawings.

THE DRAWING

In the drawing the single figure is a schematic of the Exclusive OR circuit of this invention.

INTRODUCTION TO THE CIRCUIT OF THE DRAWING

The circuit of the drawing receives signals representing binary logic variables at a plurality of input terminals 12 and it produces the Exclusive OR function of these variables at an output terminal 13. Part of the logic is performed on a stripline. A stripline may comprise a pair of flat parallel ground planes and a flat thin conductor that is positioned between the two ground planes by means of dielectric spacers. In the drawing, line 14 represents the center conductor. Other suitably shaped flat conductors can be located in the plane of the center conductor to form couplers or other circuit elements.

In the circuit of the drawing, the ends of stripline 14 are connected to ground by means of terminating resistors 15. For each input terminal 12 the circuit includes a driver 16 and stripline coupler 17. Each driver has its input connected to receive the signal at the associated terminal 12 and has its output connected to one end of a coupler. A resistor 18 is provided to connect the other end of each coupler to a suitable reference terminal 19. Suitable drivers and couplers are well known. A pulse that is applied to a coupler 17 propagates along line 14 in only one direction. In a stripline structure, two stripline couplers can be located on opposite sides of the conductor 14 so that simultaneous output pulses coincide on the line. The couplers for variables B and F illustrate this relationship. Two couplers can also be positioned at equal distances on opposite sides of a pickoff point 20 so that their pulses coincide at the pickoff point. The couplers for variables B and C and the couplers for variables B and G illustrate this relationship.

The circuit also includes a voltage level detector 25 that is connected to receive the signal at point 20 and a binary trigger circuit 30 that is connected to count pulses produced by the detector. These components will be described later. It will be helpful to analyze first how the circuit operates on the four variables, B, C, F and G, which are arranged to have their pulses coincide at point 20.

OPERATION ON VARIABLES, B, C, F AND G

The inputs at terminals 12 are binary valued electrical signals that represent 1 and 0 values of the logic variables. The pulses produced by the drivers 16 are also binary valued; preferably a pulse of predetermined amplitude represents a logical 1 and the absence of such a pulse signifies a logical 0. It is convenient to identify the pulse amplitude as a one level. Two of the drivers are arranged to produce positive pulses and the other two are arranged to produce negative pulses. The assignment of polarities to the drivers is arbitrary; for illustration the upper drivers in the drawing are positive and the lower drivers are negative.

The Exclusive OR function of four or fewer variables is satisfied if (and only if) one or three of the variables have a 1 value (more generally if an odd number have a 1 value). The combination of two positive and two negative drivers provides a simple relationship between the voltage level at point 20 and the number of variable having a 1 value. An even number of pulses can result in a zero voltage level when all four drivers are energized ($BCFG=1$), when two drivers on opposite sides of line 14 are energized ($B\overline{CF}G+\overline{B}CF\overline{G}=1$), when two drivers diagonally opposite point 20 are energized $$(B\overline{C}F\overline{G}+\overline{B}C\overline{F}G=1)$$

and of course when no drivers are energized ($\overline{BCFG}=1$). When two drivers on the same side of line 14 are energized ($BC\overline{FG}+\overline{BC}FG=1$), they produce a positive or negative two level because their pulses are of like polarity and add. Thus the complement Exclusive OR function results in a zero level or a positive or negative two level at point 20.

When the Exclusive OR function is satisfied, an odd number of pulses are formed on line 14 and the voltage at point 20 is a positive or negative one level. For any odd number of pulses fewer than four, there is one pulse for which there is no cancelling pulse of the opposite polarity. With three pulses for example, there are either two positive pulses and one negative ($BCF\overline{G}+BC\overline{F}G=1$) or two negative pulse and one positive $$(\overline{B}CFG+B\overline{C}FG=1)$$

The polarity of the voltage level at point 20 is the polarity of the majority of the pulses.

A similar analysis can be made if the pulses all have the same polarity; in this situation odd numbers of pulses produce odd numbered voltage levels and even numbers of pulses produce even numbered voltage levels. Although stripline couplers can not be conveniently arranged to produce more than four coincident pulses from simultaneous inputs, the analysis presented for four variables can be extended to any number of variables; with more than four variables the circuit does not have simplified relationship between the voltage levels and the Exclusive OR function that the circuit of the drawing achieves.

The voltage level detector 25 is arranged to produce a binary output on a line 27 differently signifying the plus or minus one levels associated with the Exclusive OR function and the zero or plus or minus two levels associated with the complement Exclusive OR. Suitable level detectors are well known. For example, the level detector may comprise a first circuit of biased diodes arranged to transmit a positive one level and to reject higher levels and negative levels, a second similar circuit arranged to transmit only negative one level signals, and suitable means to combine the two outputs. A phase inverter (such as a common emitter connected transistor stage) can be arranged to invert the output of one of these stages so that the two outputs can be connected together to produce a signal for eiher a positive or a negative one level at point 20.

OPERATION ON ADDITIONAL VARIABLES

The drawing shows additional drivers and paired couplers for variables A and E and for variables D and H. Breaks in line 14 indicate a generalized relationship between these pairs and point 20. The two pairs can be symmetrical with respect to point 20 so that their pulses coincide or they can be an unequal distance from point 20 to produce independent Exclusive OR functions. The operation of such paired or unpaired drivers and couplers is similar to the circuitry for variables B, C, F and G except that an appreciable time is required for the pulses to propagate to point 20.

As the circuit has been described so far, differently spaced groups of drivers and couplers might simply share stripline 14 and detector 25 to produce independent Exclusive OR outputs. Preferably however, the circuit makes use of this delay between successive voltage levels at point 20 to form the Exclusive OR function of many variables. This will be explained next.

When all of the inputs 12 are energized together, the corresponding pulses appear simultaneously on line 14 and propagate toward point 20. A succession of voltage levels appears at point 20 as the pulses arrive at point 20 from groups of four or fewer couplers located successively farther from point 20. A corresponding succession of binary values appears at the output 27 of detector 25. The binary trigger 30 is connected to switch its output state each time detector 25 produces an Exclusive OR signifying output. Trigger 30 has a reset input 31 and a signal is applied to this input at the beginning of an operation to give the trigger a state signifying the complementary output. Any even number of pulses returns trigger 30 to this state. In response to any odd number of pulses, trigger 30 switches to its outer output state and indicates that the input variables satisfy the Exclusive OR function.

The circuit as it has been described so far can be arranged to have no paired couplers so that all the pulses produced on line 14 appear serially at point 20. These pulses can be given the same polarity and trigger 30 can be connected to receive the pulses from point 20 and perform the Exclusive OR operation by counting.

The circuit of the drawing can be generalized to other logic functions by giving the pulses differing amplitudes or by applying identical inputs to more than one driver in a group so that the voltage level at point 20 is selected logic.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit for performing a predetermined logic function on binary logic variables appearing at a plurality of inputs, comprising, a stripline, means including a directional stripline coupler for each of said inputs operable to apply a pulse to said stripline representing one of said binary logic variables, at least four of said couplers being spaced symmetrically from a predetermined point on stripline to direct pulses to coincide at said point in response to simultaneous signals at the corresponding circuit inputs; said pulses having predetermined amplitudes representing the binary values of said variables such that the level at said point signifies said predetermined logic function of said variables, and voltage level detector means coupled to receive the voltage level at said point on said stripline and to produce a binary output signal signifying said logic function.

2. A circuit according to claim 1 in which said circuit includes a plurality of said groups of up to four couplers, said groups being differently spaced from said point whereby a succession of voltage levels appears at said point from groups successively farther from said point when the corresponding inputs are simultaneously energized.

3. A circuit according to claim 1 in which said pulses have a common amplitude whereby the voltage level at said point corresponds to the number of said corresponding circuit inputs receiving a predetermined logic value, whereby said voltage level is related to the Exclusive OR function of said variables.

4. A circuit according to claim 3 in which at least one coupler of said group is arranged to produce positive pulses and another coupler of said group is arranged to produce negative pulses, whereby when an odd number of said couplers are energized the voltage level at said point is the level of a single pulse and the polarity of said level is the polarity of the majority of the pulses produced by said couplers.

5. A circuit according to claim 4 in which said means coupled to said point includes a voltage level detector differently responsive to levels signifying the Exclusive OR function and the complement of the Exclusive OR function.

6. A circuit according to claim 2 in which said means coupled to said point includes a voltage level detector differently responsive to levels signifying the Exclusive OR function and its complement to produce a succession of binary output signals in response to said succession of voltage levels and said means coupled to said point additionally includes a binary trigger connected to differently indicate the occurrence of odd and even numbers of Exclusive OR signifying signals in said succession of output signals.

References Cited

UNITED STATES PATENTS

| | | | |
|---|---|---|---|
| 2,951,218 | 8/1960 | Arditi | 333—84 X |
| 2,977,484 | 3/1961 | Sterzer et al. | 307—210 |
| 3,038,086 | 6/1962 | Sterzer | 307—210 |
| 3,071,738 | 1/1963 | Schreiner | 328—92 X |
| 3,094,677 | 6/1963 | Theriot | 333—10 |
| 3,192,397 | 6/1965 | Nethercot | 307—210 |
| 2,934,270 | 4/1960 | Logue et al. | 307—216 X |
| 3,171,985 | 3/1965 | Freimanis | 307—218 |
| 3,351,879 | 11/1967 | Kaufman | 336—200 X |

JOHN S. HEYMAN, Primary Examiner

U.S. Cl. X.R.

307—208; 328—92; 333—84